Oct. 9, 1951 N. F. MARTIN 2,570,578

DUAL STYLUS PHONOGRAPH PICKUP

Filed March 11, 1949

INVENTOR.

Norman F. Martin

BY

Clarence J. Loftus

Atty.

136

Patented Oct. 9, 1951 2,570,578

UNITED STATES PATENT OFFICE 2,570,578

DUAL STYLUS PHONOGRAPH PICKUP

Norman F. Martin, Fort Wayne, Ind., assignor to The Magnavox Company, Fort Wayne, Ind., a corporation of Delaware Application March 11, 1949, Serial No. 80,929

10 Claims. (Cl. 179—100.41)

Figure 1:
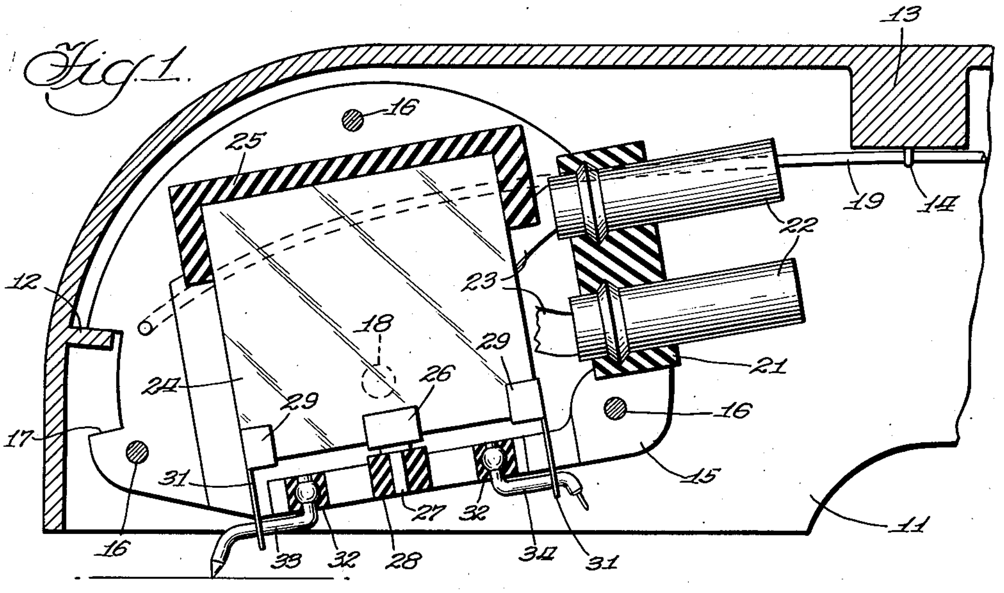

The present invention relates to electric phonographs and more particularly to a phonograph pickup arm having a cartridge arranged for the reproduction of two different types of phonograph records.

Heretofore, home phonographs have been operating at a speed of 78 R. P. M., but more recently a microgroove phonograph record has been introduced which is reproduced at a speed of about 33 R. P. M. These microgroove records which are sometimes called long-playing records have grooves closely spaced which are relatively small and require reproduction with a needle or stylus having a radius of .001 inch. The pickup arm weight at the stylus is preferably of the order from five to seven grams as compared to one and one-half ounces of force applied to the 78 R. P. M. records. In the development of record changers to accommodate both types of phonograph records it generally has been considered preferable to provide some means whereby the speed, the stylus and the pickup arm force is changed in accordance with the type of record to be reproduced. In certain record changer mechanisms it has been found that the long-playing or microgroove record can withstand a pickup arm weight of the order of one-fourth to one-third ounce and that this same force is sufficient for the reproduction of 78 R. P. M. records and for actuating the sequence operation mechanism of the record changer.

In order to provide an arrangement whereby a single pickup arm can be employed in a phonograph record changer it has been suggested to employ different cartridges each equipped with the proper stylus or phonograph needle. It, of course, would be preferable to provide an arrangement whereby a single cartridge could be employed but to accomplish this it is necessary to take into consideration that the microgroove record will not produce as great an output as the conventional record where the styli employed are substantially the same. Accordingly, it would be desirable to provide an arrangement whereby the difference in output for the two types of records would be minimized or substantially eliminated.

It is, therefore, an object of the present invention to provide an improved phonograph pickup arm construction suitable for the reproduction of two different types of phonograph records.

Still another object of the present invention is to provide in a phonograph pickup arm a single crystal cartridge equipped for the reproduction of two different types of phonograph records which will produce substantially the same output voltage.

Still another object of the present invention is to provide in a phonograph pickup arm a single cartridge having two different styli which may be brought into operating or reproducing position by a selective control means.

A still further object of the present invention is to provide in a phonograph pickup arm for the reproduction of two different types of phonograph records, a construction employing a single cartridge having a plurality of styli of different compliance characteristics.

Figure 2:
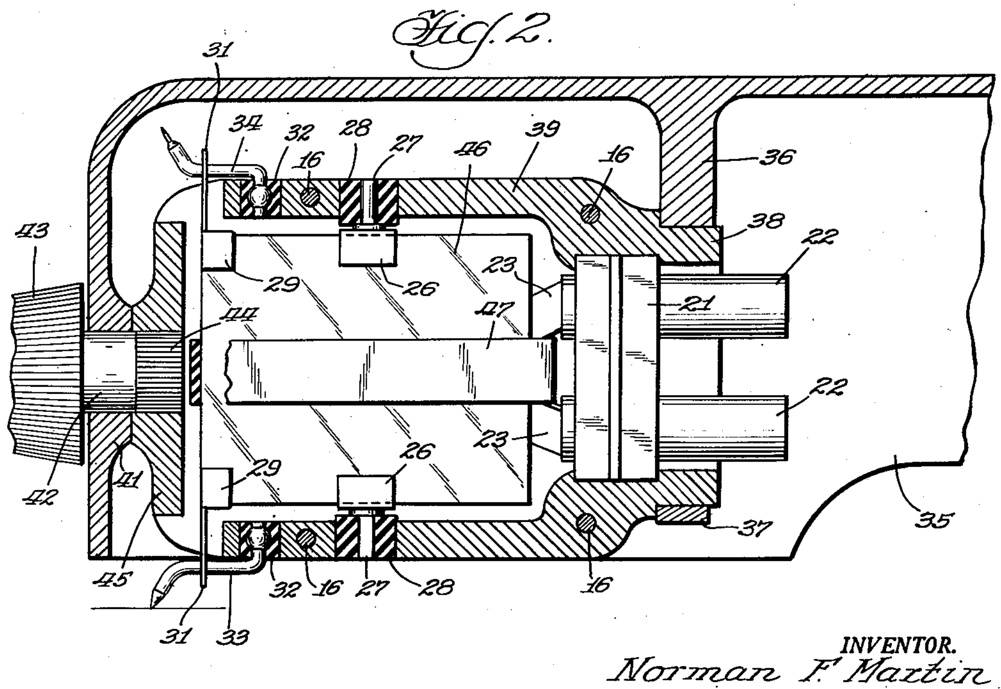

Other and further objects of the present invention subsequently will become apparent by reference to the following description taken in conjunction with the accompanying drawings wherein:

Fig. 1 is a cross-sectional view of the forward portion of a phonograph pickup arm showing a cross-sectional view of the crystal cartridge embodying the present invention; and Fig. 2 is another cross-sectional view of the forward portion of a phonograph pickup arm showing in cross-section another embodiment of a pickup cartridge employing the principles of the present invention.

Referring to Fig. 1 of the drawings there is shown the forward portion of a phonograph pickup arm 11 having at its inner front surface a stop member 12. The pickup arm may be of any suitable construction, and more commonly such arms now are made of a molded plastic composition having certain reinforcing ribs and struts on the inside of the arm. The arm 11, therefore, may contain a number of struts 13, each of which may carry an eyelet or guide 14 for a purpose which subsequently will become apparent.

Pivotally mounted within the arm 11 is a pickup cartridge having a casing formed of two similar portions 15 which are held together by a plurality of rivets 16 or other suitable fastening means. The forward edge of each casing portion 15 is provided with a recess 17 which in cooperation with the stop member 12 of the arm 11 serves to positively locate the position of the pivoted pickup cartridge at either of two positions.

The cartridge is suitably mounted by means of a pivot 18 which may comprise pivot members formed on opposite sides of the cartridge and which fit into suitable recesses in reinforced portions of the inner surface of the arm 11. The cartridge is moved to either of two positions by a wire or control cable 19 which extends to the rear of the pickup arm 11. The wire 19 is actuated by any suitable means such as a cam and lever action or may be controlled by a knob or lever which serves to bring about a change in the force exerted by the outer free end of the arm 11, a change in the speed of operation of the turn table and the movement of the proper stylus into reproducing position. Any other arrangement may also be employed to accomplish the same purpose and an example of the details of a typical construction are shown and described in the co-pending application of Martin and Dreisbach, Serial No. 78,356, filed Feb. 25, 1949.

Fitted between the two halves of the casing 15 is an insulating block 21 which carries a pair of terminals or connectors 22 each of which is connected by a flexible conductor 23 to a piezo electric crystal 24.

The crystal 24 is supported along one edge at a portion of the opposite side by a resilient head or insulating member 25. The opposite edge of the crystal is engaged by a clip 26 secured to a stud or rod 27 which is mounted in a resilient sleeve 28. The crystal 24 is of the twister type and the mounting comprising the clip 26, the shaft 27 and the resilient sleeve or grommet 28 provides a certain degree of freedom of this edge of the crystal 24. Adjacent corners of the crystal 24 are each provided with driving members comprising clips 29 having extension members 31 which extend through a suitable opening in the casing 15 to the exterior of the casing. The extension members 31 are provided with openings or notches which are engaged by styli. The lower edge of the casing 15 is provided with suitable openings carrying a resilient sleeve 32 forming a socket for the reception of one end of a phonograph needle or stylus.

It will be apparent that in the arrangement shown one corner of the crystal 24 is actuated in response to a stylus 33 which is of such construction as to be suitable for the reproduction of the conventional 78 R. P. M. records. The adjacent corner of the crystal 24 is arranged to be actuated in response to a stylus 34 which is of a different construction suitable for the reproduction of the microgroove or long playing phonograph record. The radius of the tip of the stylus or needle 34 is of the order of .001 inch which is about one-third of the radius employed at the tip of the stylus 33. The two styli have different mechanical transformation ratios so that each type of phonograph record produces a crystal output which is of the same order of magnitude as that for the other type of phonograph record.

It will be appreciated that the embodiment shown in Fig. 1 permits the reproduction of two different types of phonograph records by the shifting or tilting of the crystal cartridge which thereby moves a selected stylus into playing position. Such arrangement, therefore, is suitable for the type of apparatus where the same pickup arm force is employed for the reproduction of both phonograph records or where a heavier pickup arm force is employed for the reproduction of the conventional 78 R. P. M. records. The shifting of the cartridge so as to move one stylus out of and the other stylus into playing position may be accompanied by simultaneous control of the change in speed of the turn table. Duplication of arms and cartridges is avoided thereby providing a more economical and trouble-free apparatus.

While the embodiment shown in Fig. 1 showed a cartridge which was shiftable about a transverse horizontal axis, the arrangement illustrated in Fig. 2 shows a cartridge which is shiftable or rotatable about a horizontal axis passing longitudinally through the center of the cartridge.

For the convenience of simplifying the disclosure and explanation similar reference characters have been given to those elements of the construction which are substantially identical to corresponding elements in the embodiment illustrated in Fig. 1. It will be noted that a pickup arm 35 has a depending web 36 which has a semi-circular recess therein. A semi-circular metal clip 37 is secured to the web 36 to provide a bearing for a cylindrical extension 38 of the crystal pickup cartridge casing 39. At the forward end of the arm 35 there is provided a boss 41 for receiving a shaft 42 carrying a control knob 43. One extremity of the shaft 42 may be serrated or otherwise so formed as to permit it to be keyed to a cooperating recess formed in the forward portion of the casing 39. If desired the casing 39 which is formed of two similar halves held together by the rivet 16 may have a recess for receiving an actuating member of wedge-like shape 45 which is engaged by the serrated portion 44 of the shaft 42. The particular construction just described may be varied appreciably without departing from the scope of the present invention since obviously other constructions may be provided whereby the pickup cartridge 39 may be rotated about a longitudinal horizontal axis.

A crystal 46 is mounted within the casing 39 by means of clips 26 having cylindrical studs 27 positioned within the resilient support sleeve 28. Extending about the horizontal axis of the crystal 46 is a resilient support pad 47 which engages opposite sides of the chamber formed within the casing 39. The pad 47 performs a function similar to the support member 25 illustrated in Fig. 1.

Adjacent corners of the crystal 46 are arranged to be actuated by the driving members which comprise the clips 29 having extension pieces 31 which are so formed as to be engaged by the styli 33 and 34.

Fig. 2 shows the pickup cartridge positioned so that the stylus 33 is in position for reproducing the conventional 78 R. P. M. record. If it is desired to reproduce the microgroove or long playing record the knob 43 is actuated so as to rotate the casing 39 through an angle of 180° whereby the stylus 34 will be moved into reproducing position. The stylus 33 then will occupy the upper position in Fig. 2. Such an arrangement is adaptable without further modification to those pickup arms employed with record changers or electric photographs where the same arm weight is employed for the reproduction of both types of records. Quite obviously, suitable modifications could be made to cause the rotation of the knob 43 to actuate cooperating contacts so as to bring about through suitable relays a change in the driving speed of the turn table, and if desired other relays might be provided for changing the effective force of the pickup arm.

It, therefore, becomes apparent that the present invention provides for the reproduction of two different types of phonograph records by means of the single crystal cartridge which produces output voltages which are comparatively equal for the different types of phonograph records due to the construction employed which includes styli having different compliance characteristics. Such an arrangement simplifies the original construction and makes servicing and replacement less expensive.

While for the purpose of illustrating and describing the present invention certain embodiments have been shown in the drawings, it is to be understood that the invention is not to be limited thereby since such variations are contemplated in the construction and in the components employed as may be commensurate with the spirit and scope of the invention as defined in the accompanying claims.

What I desire to protect by United States Letters Patent is claimed as follows:

1. A phonograph pickup arm having a cartridge casing shiftably mounted thereon, a piezoelectric crystal located within said casing, a first crystal actuating member mounted on one corner of said crystal, a second crystal actuating member mounted on another corner of said crystal, a plurality of different styli having different compliance characteristics for reproduction of different types of phonograph records, each stylus being mounted in engagement with one of said actuating members.

2. A phonograph pickup arm having a cartridge casing shiftably mounted thereon for movement to either of two positions, a piezoelectric crystal located within said casing, a pair of crystal driving members mounted on adjacent corners of said crystal, a plurality of stylus sockets located along the edge of said casing, a plurality of styli having different compliance characteristics mounted in said sockets for reproduction of different types of phonograph records, each stylus being mounted in engagement with one of said driving members, and means for shifting said casing to bring a selected stylus into reproducing position.

3. In a phonograph pickup arm the combination comprising a cartridge casing pivotally mounted on said arm, a piezo electric crystal located within said casing, a pair of crystal driving members mounted on adjacent lower corners of said crystal and extending to the exterior of said casing, a plurality of stylus sockets located along the lower edge of said casing, a plurality of styli having different compliance characteristics for reproduction of different types of phonograph records, each stylus being mounted in one of said sockets and in engagement with said driving members, and means for pivoting said casing to bring a selected stylus into reproducing position.

4. A phonograph pickup arm having a cartridge casing rotatably mounted thereon for movement to either of two positions, a piezoelectric crystal mounted within said casing, a pair of crystal driving members mounted on adjacent forward corners of said crystal and extending to the exterior of said casing, a plurality of stylus sockets located along the edges of said casing, and a plurality of different styli for reproducing different types of phonograph records, each stylus being mounted in one of said sockets and in engagement with one of said driving members for actuation thereof.

5. In a phonograph pickup arm the combination comprising a cartridge casing movably mounted thereon for movement to either of two positions, a piezoelectric crystal mounted within said casing, a pair of crystal driving members mounted on adjacent corners of said crystal and extending to the exterior of said casing, a plurality of stylus sockets each having a resilient sleeve and being located along the edge of said casing, a plurality of styli for reproduction of different types of phonograph records, each stylus having one end mounted in one of said sockets and in engagement with one of said driving members for actuation thereof, and means for moving said casing to bring a selected stylus into reproducing position.

6. A phonograph pickup arm having a cartridge casing movably mounted thereon, said casing being arranged for selective movement to either of two positions, a piezoelectric crystal of the twister type mounted within said casing, a pair of crystal driving members each secured to adjacent corners of said crystal, a plurality of stylus sockets each having a resilient sleeve and being located adjacent said driving members, a plurality of different styli for reproduction of different types of phonograph records, each stylus having one end mounted in one of said sockets and passing through said driving members for actuation thereof, and means for moving said casing to bring a selected stylus into reproducing position.

7. A phonograph pickup arm having a cartridge casing movably mounted thereon for movement to either of two selected positions, a piezoelectric crystal of the twister type mounted within said casing, a pair of crystal driving members each secured to adjacent corners of said crystal, said driving members each having a portion thereof extending to the exterior of said casing and having an opening formed therein, a plurality of stylus sockets each having a resilient sleeve and being located adjacent said driving members, a plurality of different styli for the reproduction of different types of phonograph records, each stylus having one end mounted in one of said sockets and extending through said driving member openings at substantially right angles thereto for actuation of said driving member.

8. A phonograph pickup arm having a cartridge casing rotatably mounted along its longitudinal axis for movement to either of two selected positions, a piezoelectric crystal of the twister type mounted within said casing, said crystal being supported by a resilient member extending longitudinally about its center on opposite sides of said crystal, opposite edges of said crystal each having a limited resilient support to permit torsional movement to be applied to the crystal edge, a pair of crystal driving members each secured to adjacent corners of said crystal, said driving members having a portion thereof extending to the exterior of said casing and having an opening formed therein, a plurality of stylus sockets each having a resilient sleeve and being located adjacent said driving members, a plurality of different styli having compliance characteristics suitable for the reproduction of different types of phonograph records, each stylus having one end mounted in one of said sockets and extending through the opening of one of said driving members at substantially right angles thereto, a control knob and shaft mounted on said arm, and means interconnecting said shaft with said cartridge.

9. A phonograph pickup arm having a cartridge casing pivotally mounted on a transverse axis with respect to the casing for movement to either of two selected positions, a piezoelectric crystal of the twister type, said crystal being supported along one edge by a resilient support within said casing, the opposite edge of said crystal at its center having a limited resilient support to permit torsional movement to be applied to the edge, a pair of crystal driving members each secured to adjacent corners of said crystal, said driving members having a portion thereof extending to the exterior of said casing and having an opening formed therein, a plurality of stylus sockets each having a resilient sleeve and being located along the edge of said casing adjacent said driving members, a plurality of styli having different compliance characteristics for the reproduction of different types of phonograph records, each stylus having one end mounted in one of said sockets and extending through the opening in its driving member at substantially right angles thereto.

10. A phonograph pickup arm having a pivotally mounted cartridge casing for selective movement to either of two positions, a piezoelectric crystal of the twister type mounted within said casing, a pair of crystal driving members each secured to one of the adjacent corners of said crystal, each driving member extending to the exterior of said casing, each member having therein an opening, a plurality of stylus sockets formed in said casing adjacent said driving members, a resilient sleeve for each of said sockets, a plurality of different styli for the reproduction of different types of phonograph records, each stylus having one end mounted in one of said resilient sleeves and passing through the opening in one of said driving members for actuation thereof with substantially equal force for a different record amplitude, and manually operable means for moving said casing to a selected position to bring a selected stylus into reproducing position.

NORMAN F. MARTIN.

REFERENCES CITED

The following references are of record in the file of this patent:

UNITED STATES PATENTS

| Number | Name | Date |
|---|---|---|
| 1,504,433 | Corswandt | Aug. 12, 1924 |
| 1,570,297 | Dyer | Jan. 19, 1926 |
| 1,822,932 | Loughridge | Sept. 15, 1931 |
| 2,110,223 | Harris | Mar. 8, 1938 |
| 2,267,693 | DiToro | Dec. 23, 1941 |
| 2,332,204 | Chorpening | Oct. 19, 1943 |
| 2,479,894 | Andrews | Aug. 23, 1949 |